US006687644B1

(12) United States Patent
Zinke et al.

(10) Patent No.: US 6,687,644 B1
(45) Date of Patent: Feb. 3, 2004

(54) METHOD AND CIRCUIT FOR TRANSMITTING INFORMATION ON ROTATIONAL SPEED AND ADDITIONAL DATA

(75) Inventors: Olaf Zinke, Hattersheim (DE); Wolfgang Fey, Niedernhausen (DE); Michael Zydek, Langgöns (DE); Heinz Loreck, Idstein (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/319,344

(22) PCT Filed: Nov. 8, 1997

(86) PCT No.: PCT/EP97/06209

§ 371 (c)(1),
(2), (4) Date: Aug. 12, 1999

(87) PCT Pub. No.: WO98/25148

PCT Pub. Date: Jun. 11, 1998

(30) Foreign Application Priority Data

Dec. 7, 1996  (DE) ......................................... 196 50 935

(51) Int. Cl.$^7$ ................................................. G01P 3/00
(52) U.S. Cl. .......................... 702/145; 702/148; 73/488
(58) Field of Search ........................ 73/488, 495, 509, 73/510, 514.39, 527, 528; 324/166, 178, 207.25, 207.23, 207.24, 226, 227; 370/528, 527; 303/121; 702/145, 148

(56) References Cited

U.S. PATENT DOCUMENTS 5,335,540 A    8/1994  Bowler et al. ............. 73/146.5

6,109,102 A *  8/2000  Schneider ..................... 73/488
6,339,322 B1 * 1/2002  Loreck et al. ............... 324/166

FOREIGN PATENT DOCUMENTS

| DE | 22 42 639  | 3/1974  |
| DE | 36 15 452  | 11/1987 |
| DE | 43 09 989  | 10/1993 |
| DE | 43 23 619  | 9/1994  |
| DE | 195 04 822 | 9/1996  |
| DE | 195 17 437 | 11/1996 |
| DE | 195 23 940 | 1/1997  |
| DE | 195 36 006 | 4/1997  |
| EP | 0 376 039  | 7/1990  |
| EP | 0 695 652  | 2/1996  |
| WO | 95 17680   | 6/1995  |

* cited by examiner

*Primary Examiner*—John Barlow
*Assistant Examiner*—Stephen J. Cherry
(74) *Attorney, Agent, or Firm*—Rader, Fishman & Grauer PLLC

(57) ABSTRACT

To transmit data which is supplied by a rotational speed sensor in the form of an alternating signal as well as additional data via a signal line, a sequence of current pulses of a predetermined duration is derived from the alternating signal, the pulse intervals or interpulse periods containing the information on rotational speed. The additional data is transmitted in the interpulse periods, and transmission of the additional data is synchronized by the individual rotating signal sensor pulses. Preferably, the method is employed for active sensors, and both the sensor pulses and the additional data are transmitted in the form of current signals. During standstill, in the absence of a sensor pulse, transmission of the additional data is triggered by auxiliary synchronization pulses.

14 Claims, 5 Drawing Sheets data transmission at rotational speed > minimum rotationsl speed

METHOD AND CIRCUIT FOR TRANSMITTING INFORMATION ON ROTATIONAL SPEED AND ADDITIONAL DATA

TECHNICAL FIELD

The present invention generally relates to a data transmission system and more particularly relates to a system of transmitting data, which is supplied by a rotational speed sensor in the form of an alternating signal, as well as additional data via a joint signal line.

BACKGROUND OF THE INVENTION

Rotational speed sensors are required, among others, in motor-vehicle engineering in order to produce one of the most important input quantities of many vehicle control systems. For example, anti-lock systems (ABS), traction slip control systems (TCS) and driving stability control systems (DSC, ASMS) known in the art are based on the constant measuring and evaluating of the rotational behavior of the individual vehicle wheels. The rotational speed data of each individual wheel are sensed and transmitted to an evaluating electronics by way of one or more wires (i.e. cable).

Rotational speed sensors of most different types and output capacities are provided. The sensors employed in automotive vehicles are mainly comprised of an encoder configured as a toothed disc, hole disc, etc., and rotating with the wheel, and a stationary measuring data transducer. For technological and cost reasons, inductive sensors or transducers have previously been preferred, wherein the encoder produces an alternating electrical signal representative of the rotation of the wheel. The frequency of the alternating signal is evaluated in a different fashion for the acquisition of information on rotational speeds.

Active rotational speed sensors are gaining in significance. An active sensor of this type has already been described in WO 95/17680 (P 7805). The stationary-part of the sensor in such active sensors includes, for example, a magnetoresistive sensor element with a permanent magnet used as a biassing magnet, and also electronic circuits. An active sensor requires current supply. The output signal of the active sensor is a binary current signal which is composed of load-independent currents of different amplitudes. The rotational speed information is included in the frequency or in the change between the two current levels. Prior art sensors of this type produce a square-wave signal whose frequency represents the measured rotational speed.

The manufacturing costs involved in automotive vehicle control systems of the type described herein are of major importance under marketing aspects. There is relatively much effort and structure needed for sensing the rotational behavior of all wheels, and transmitting and evaluating the information. In addition, further pieces of information of most different types occurring on each wheel, such as brake lining wear, the air slot between encoder and sensor, the temperature of the brakes or brake fluid temperature, the brake fluid condition, etc., must be established and transmitted to the evaluating circuit.

An object of the present invention is to reduce the total expenditure incurred for measuring and evaluating the information sensed on the wheel and the complexity of transmitting the measured data from the wheels to the evaluating circuit (expenditure in wiring), or, in other words, to improve the utilization of the wiring arrangement between the individual (active) sensors and the central evaluating circuit.

It has been found that this object can be achieved by the method described of the present invention wherein a sequence of pulses of a given duration is produced from the alternating signal, and the pulse intervals or interpulse periods contain information on rotational speed, and that the additional data are transmitted in the interpulse periods, and the transmission of the additional data is triggered or synchronized by the individual pulses.

Thus, the present invention is based on the recognition that the cable (single-wire or two-wire cable) between the individual wheel sensors and the central evaluating electronics can additionally be used for the transmission of further wheel data, for example, about the brake lining wear, the air slot between the encoder and the rotational speed sensor element, about the temperature on the wheel, the compression travel of the vibration dampers, and/or about many other data, and that this is possible without additional effort and structure by using the method of the present invention.

In an embodiment of the method of the present invention, the additional data is included in a sequence of binary signals or in a bit sequence which is transmitted following each sensor pulse or synchronization pulse. Appropriately, the total duration of the signal sequence or bit sequence is shorter than the interpulse period which occurs between the successive sensor pulses at maximum rotational speed.

Further, it has been proven favorable that the time basis for the sensor pulses and for the binary signals which contain the additional data is produced by way of a common oscillator or clock pulse generator. The accuracy of frequency of such an oscillator must satisfy only low requirements.

Still further, it is favorable to use an active sensor for determining the rotational speed, the sensor supplying the rotational speed data in the form of load-independent currents of different amplitudes, and to also transmit the additional data in the form of currents of a predetermined amplitude. In this case, a basic current value which is sufficient for the operation of the active sensor, a mean current value for transmitting the additional data and a top current value for representing the sensor pulses are predetermined on the transmission line. Besides, the information when a defined minimum current value falls below and when a maximum current value is exceeded on the transmission line can be used for error detection, such as line interruption, shortcircuit to ground or battery, etc.

Another improvement of the method of the present invention is achieved when, upon wheel standstill recognition or in the absence of a sensor pulse beyond a predetermined time period, a secondary or auxiliary synchronization pulse is generated which triggers the transmission of the additional data. This is because there are wheel data, such as brake lining wear indicator and many others, which should absolutely be transmitted and evaluated even at standstill of the vehicle.

However, the transmission of the wheel sensor data has priority. Therefore, according to the present invention, the data flow is interrupted and restarted by a sensor pulse as soon as the sensor pulse occurs during a transmission of additional data, triggered by the secondary synchronization pulse.

DETAILED DESCRIPTION OF THE PREFERRED EMBODIMENTS

Figure 1:
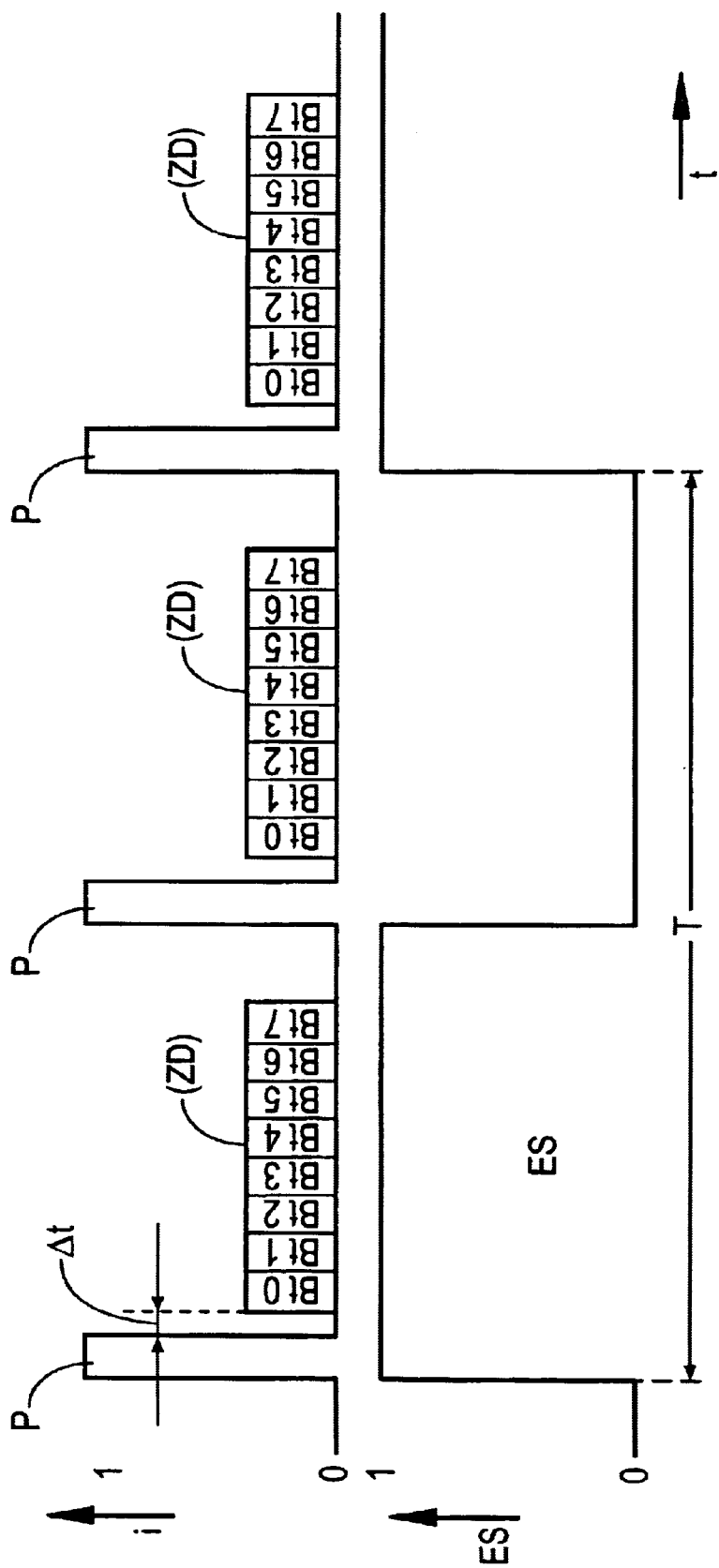
FIG. 1 is the variation of the transmitted signal on the transmission line plotted against time, i.e., a so-called transmission protocol.

The embodiment of FIG. 1 serves to explain the principal operation and the sequence of the method of the present invention. Shown is the variation against time of the current i on the transmission line which connects a vehicle wheel to the central evaluating electronics. However, not only the information on rotational speed, but also additional information which was obtained by way of a brake lining wear indicator and/or special sensors shall be transmitted via this cable.

The variation of the encoder signal ES in FIG. 1 represents the relative movement of the encoder in relation to the stationary transducer or rotational speed sensor in an idealized fashion. Such an alternating signal which alternates between the values 0 and 1 and the frequency or period duration T of which represents the rotational movement is available at the output of a rotational speed sensor. In an active sensor, 0 and 1 represent defined, load-independent current signals or current levels having amplitudes and magnitudes which, as is known, are independent of the rotational speed, in contrast to the output voltage of an inductive sensor.

The current level 0 represents a relatively low current value which must be sufficient for the functioning or operation of the active sensor only, while 1 represents a comparatively high signal current.

According to the present invention, a rotational speed sensor pulse P is generated and transmitted via the signal line with each signal alternation 0/1 or 1/0 (edge alternation of the signal generator wheel or encoder). This considerably reduces the power loss compared to the transmission of the rotational speed sensor information with the aid of the square-wave signal ES.

In the pauses between two successive sensor pulses P, additional data are transmitted in the form of a sequence made up of binary signals or a bit sequence Bt0 to Bt7 according to the present invention. Each sensor pulse P is simultaneously used as a synchronization signal which triggers a transmission of the additional data Bt0 to Bt7. A separation of the rotational speed sensor data (ES) and the additional data ZD (Bt0 to Bt7) is ensured in a most simple way by different signal levels or current amplitudes for the transmission of the sensor pulses P and the additional data Bt0 to Bt7 (ZD).

The instantaneous current level on the data transmission line is evaluated for the identification of the transmitted rotational speed data and additional data, for the separation of these data and for the error detection. This is explained in the following by way of FIG. 2.

An insufficient current, lying below a minimum value $I_{min}'$ or a too high current, lying above a maximum value $I_{max}'$ is evaluated for error detection. A 'basic current value' which is in excess of this minimum value and within a tolerance range $I_L$ is sufficient for the function of an active sensor. As is known, active sensors must constantly be supplied with electric energy. A 'medium current value' which lies within a tolerance range $I_{H1}$ is available for the transmission of the additional data ZD (Bt0 to Bt7). Towards the top, as is shown in FIG. 2, there follows another tolerance range $I_{H2}$ for a 'top current value' which is reserved for the sensor pulse that occurs during each edge alternation.

Figure 2:
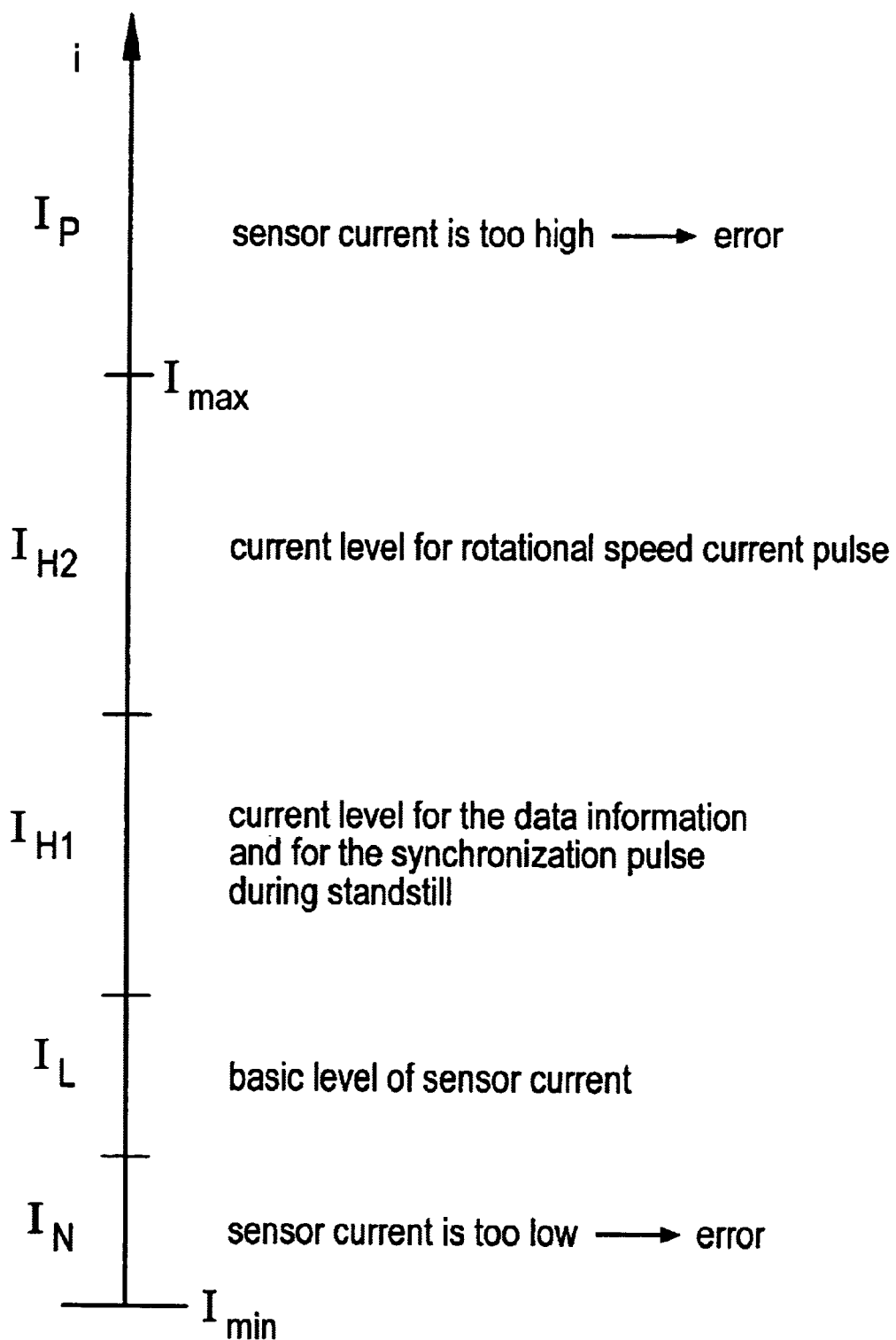
FIG. 2 is a graph showing the predetermined current limit values and current levels.

FIG. 2 in conjunction with FIG. 1 illustrates that the present invention permits achieving a simple, fail-free, loss-minimized method of transmitting the sensor data and additional data.

Another special feature of the present invention involves that the additional data is transmitted even upon standstill of the vehicle and at very low rotational speeds. In the absence of a rotational speed sensor pulse P beyond a predetermined period T, an auxiliary synchronization signal is generated to this end which triggers a transmission of the additional data ZD similarly as a sensor pulse P. This is because there is information, which belongs to the pieces of information herein referred to as additional data, which should be transmitted and evaluated even at standstill of the vehicle.

Figure 3A:
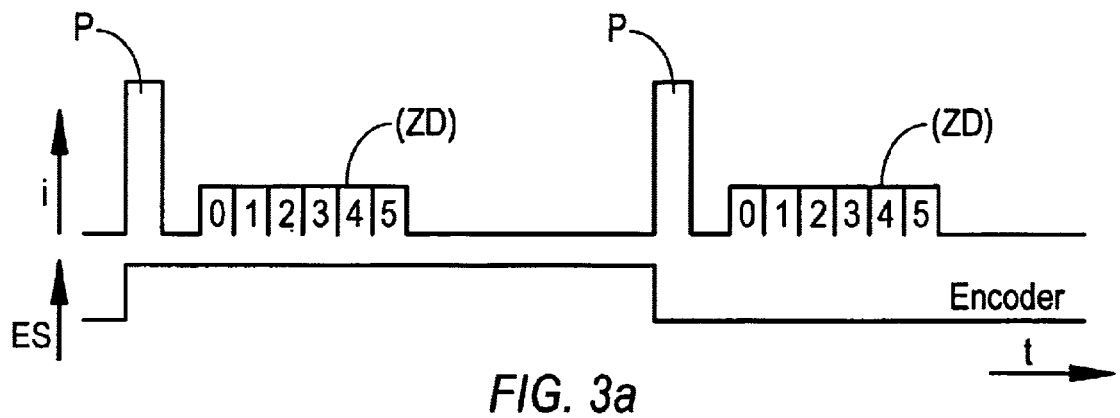
FIG. 3 a) to c) are further diagrams showing the current variation on the transmission line as a function of the data transmission.
Figure 3B:
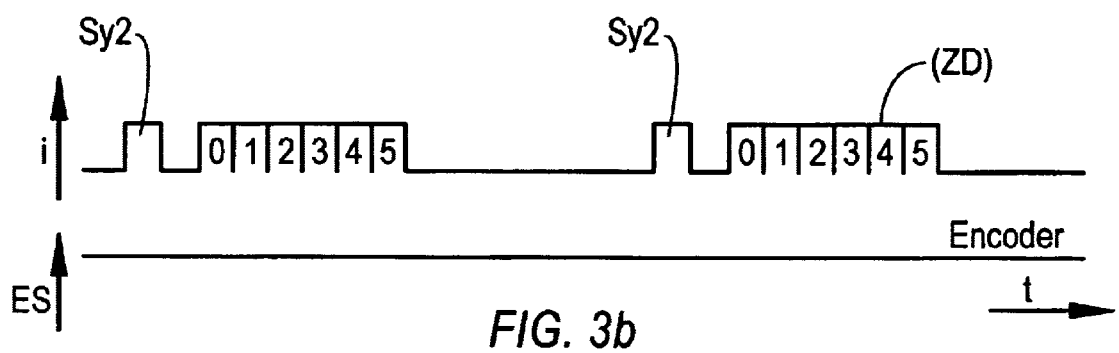
Figure 3C:
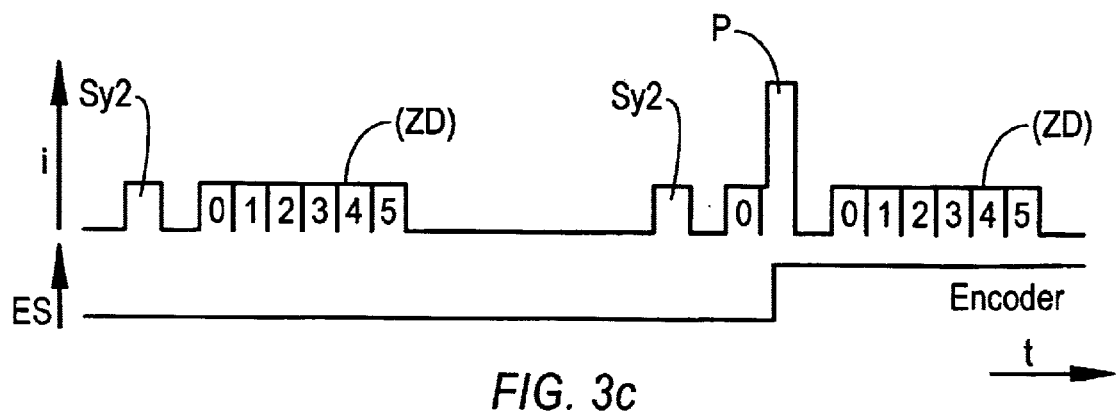

FIG. 3 serves to illustrate the data transmission with rotating wheel (FIG. 3a), at vehicle standstill (FIG. 3b) and at very low rotational speeds (FIG. 3c). The additional data ZD is represented herein by 0,1,2,3,4,5.

In the embodiment of FIG. 3c, a sensor pulse P appears again after a longer absence of the rotational speed sensor pulse and triggering of the additional data transmission by auxiliary synchronization pulses Sy2. The synchronization by the sensor pulse P has priority, and the transmission of additional data which takes place exactly in the situation of FIG. 3c is interrupted and restarted in a manner synchronized by the transmission pulse P.

It becomes apparent from the embodiments of FIGS. 3b and 3c that the amplitude of the auxiliary synchronization pulse Sy2 lies within the tolerance range $I_{H1}$ provided for the transmission of additional data. This renders it possible in a simple fashion to separate the rotational speed sensor pulse P from the auxiliary synchronization pulse Sy2.

Only a fraction of the previously required power loss is caused in the active sensor and in the electronic evaluating circuit when 'small', i.e., short sensor current pulses P instead of the sensor current signals ES (see FIG. 1) are used. This permits reducing the overall dimensions (chip space) and, thus, also the manufacturing costs. The original signal which follows the shape of the encoder (square-wave signal ES in FIG. 1) can be reproduced by a simple frequency halving in a known manner by way of an edge-triggered flipflop within the evaluating circuit. It is easily possible in practice to generate a rotational speed sensor pulse P within the sensor because sensors of this type anyway require an oscillator for data processing and transmission.

The transmission of the additional data ZD is performed during the pauses between the rotational speed sensor pulses P, as has already been explained hereinabove. The additional data (for example, 8 bit) is transmitted in the form of current pulses (bit pulses, '0,1,2,3,4,5'). When the logical condition 1 is to be transmitted for a bit, a current pulse on a third current level is generated during the period which is reserved for this bit. Appropriately, a current range between the basic level and the current level of the sensor pulse is determined for this purpose, as has been explained by way of FIG. 2.

Figure 4A:
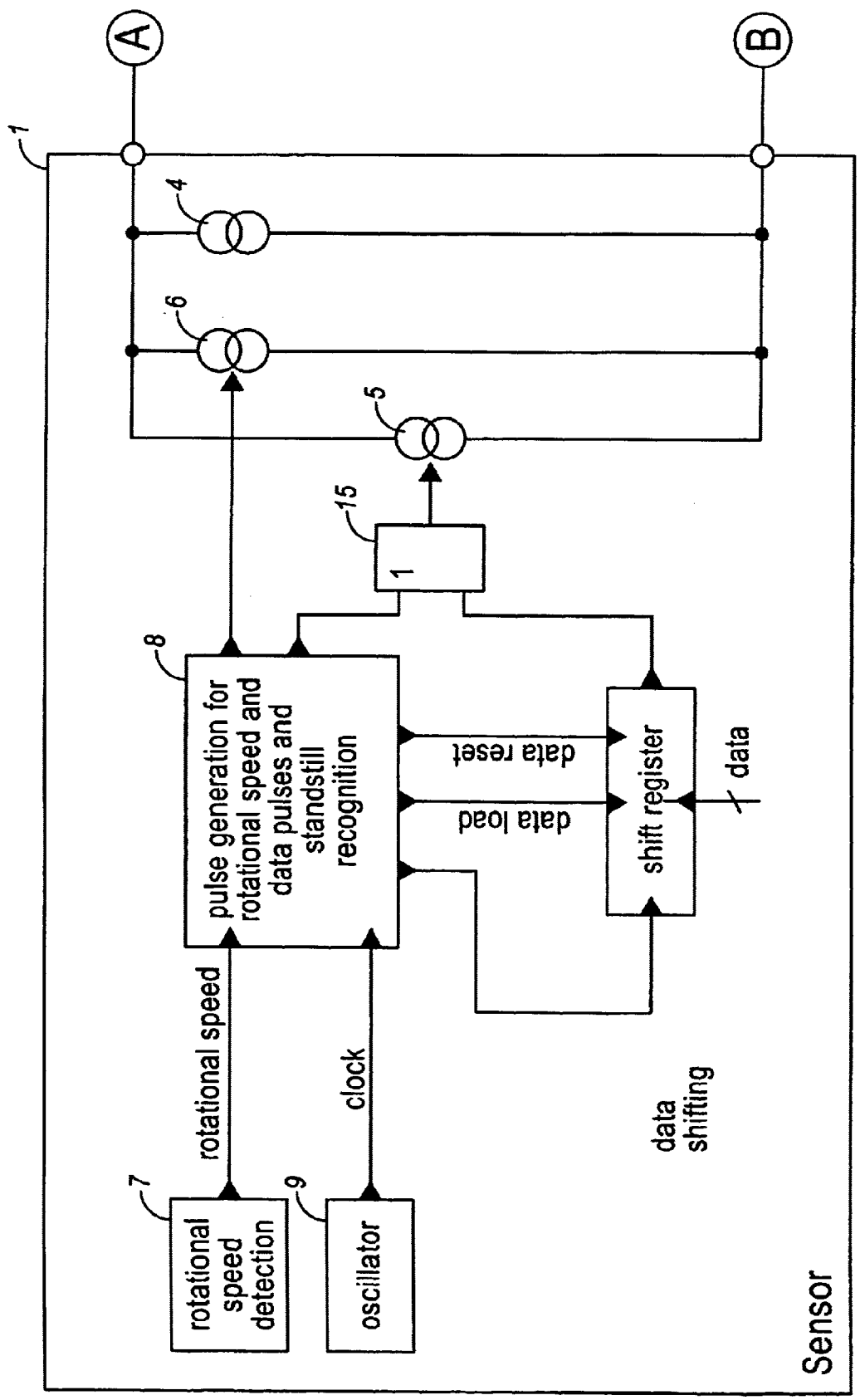
FIG. 4 (consisting of FIGS. 4A and 4B) is a block diagram of a circuit arrangement according to the present invention.
Figure 4B:
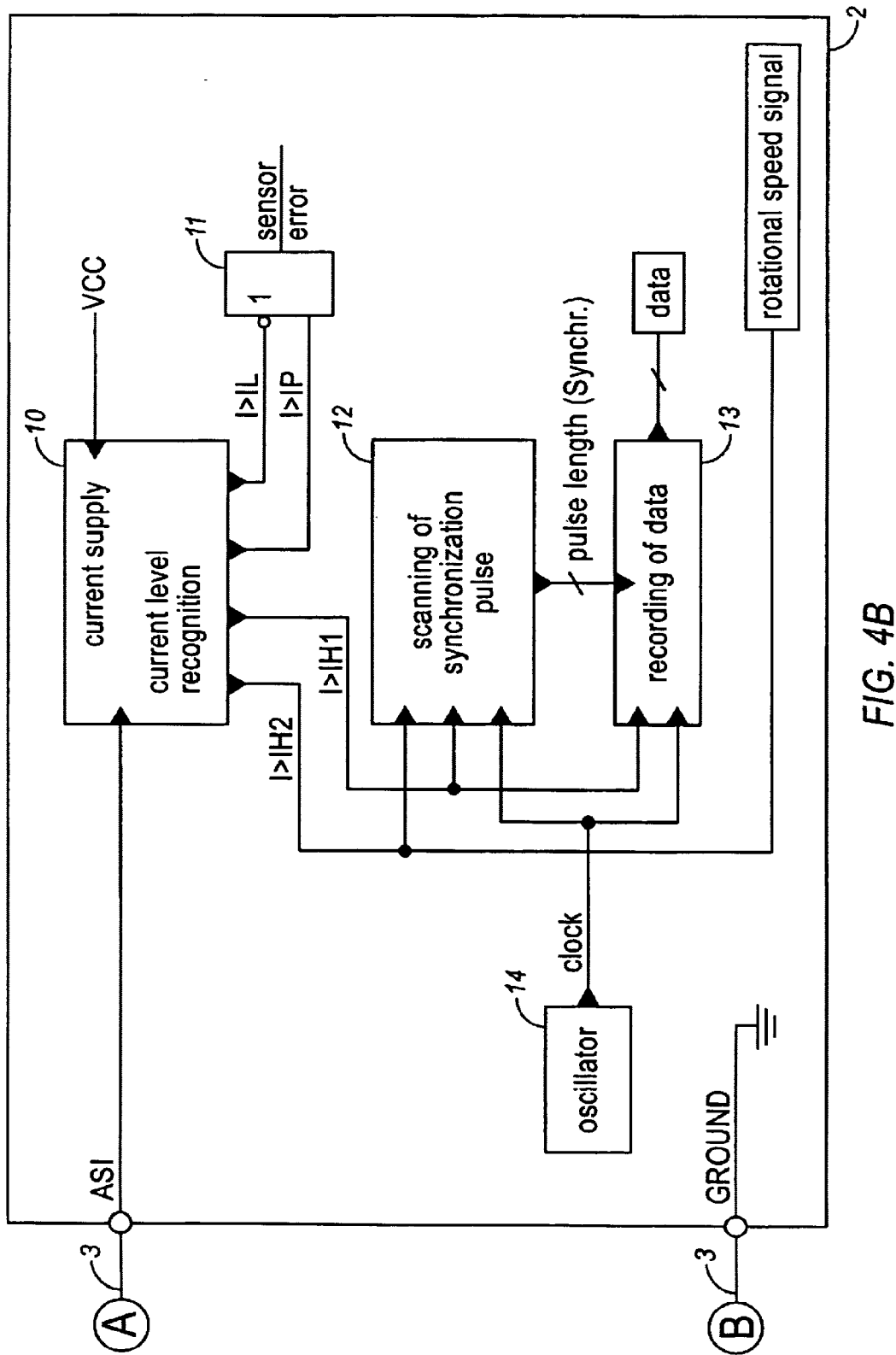

FIG. 4 shows an embodiment of a circuit arrangement for implementing the method of the present invention.

The components pertaining to an active sensor are integrated in a block 1, and the components required for evaluating the transmitted data are integrated in another block 2. A transmission line 3 connects the sensor block 1 to the evaluating circuit 2.

The current signals required for the operation of the active sensor (1) and for the data transmission are generated in FIG. 4 by way of the three represented current sources 4, 5 and 6. A current source 4 produces the basic value of the current of e.g. 5 milliampere which is necessary for the operation of the sensor. A current source 5 with a load-independent current of also 5 ma, for example, is connected for the transmission of the additional data (ZD). The third current source 6 which is rated for a load-independent current of 10 ma in the present embodiment is activated in addition to the current source 5 by way of an OR gate 15 in order to provide a load-independent current of 20 mA in total for the duration of a sensor pulse P.

For determining the rotational speed, a sensor element 7 is provided in the interior of the active sensor (1) which has an output signal that activates the current sources 5 alone or the current sources 5 and 6 by way of a pulse generating circuit and signal processing unit 8. Because the data pulses have a predefined duration, an oscillator 9 establishing a time basis is provided in the sensor block 1. Where the objective is to minimize the expenditure in manufacture, such oscillators can be achieved only with relatively great frequency tolerances, which is due to the wide swing of the supply voltage and the great temperature variations. Therefore, the duration of the data pulses is also largely affected by tolerances. Synchronization pulses are utilized in order to nevertheless permit a reliable evaluation of the transmitted sensor data and the additional data, as has been explained hereinabove.

Especially appropriate is the transmission protocol, which has already been described with respect to FIG. 1, wherein the rotational speed sensor pulse P is simultaneously used as the synchronization pulse for the transmission of the additional data ZD. Following the leading flank of a pulse P is a dwell time on the top current level $I_{H2}$ This dwell time corresponds to the duration of a predetermined number of oscillator periods which is set by the logic circuit in the sensor 1. A predetermined, short time interval $\Delta t$ (see FIG. 1) is maintained between the sensor and synchronization pulse P and the transmission of additional data. The pulse widths of the rotational speed sensor and synchronization pulses P and the data pulses Bt0 to Bt7 are rated so that a complete transmission of the additional data Bt0 to Bt7 (ZD) is still possible, even at the highest wheel rotational speed, when the pause between successive pulses P is shortest.

The signal evaluating circuit 8 includes a time measuring device which permits evaluating the width of the synchronization pulses. Due to this time measurement, the sensor current signal is then scanned to recover the transmitted data. It is made use of in this respect that the frequency variations of the oscillator 9 are slow in comparison to the time interval $\Delta t$ between the sensor and synchronization pulse P and the transmitted data Bt0 to Bt7.

The recognition of the transmitted current level is accommodated in a circuit block 10 of the evaluating circuit 2. When the current lies below the minimum value $I_{min}$ or above the maximum value $I_{max}$' it is signaled via an OR gate 11 that there is an error (shortcircuit, shunt, line interruption). The synchronization pulses P, Sy2 are scanned, i.e., the pulses are identified and the pulse duration is measured by way of a scanning circuit 12. A memory 13 is provided to record the additional data. The working clock for the circuits 12 and 13 is generated by an oscillator 14. The transmitted additional data are recorded in the memory 13 and made available for further processing via an output-'data'. Finally, there is still an output 'rotational speed signal' for the propagation of the transmitted sensor information, to which a signal is applied when the transmitted current amplitude i lies in the tolerance range $I_{H2}$.

What is claimed is:

1. Method of transmitting data, which is supplied by a rotational speed sensor in the form of an alternating signal, as well as additional data by way of a joint signal line, comprising the step of:

producing a sequence of pulses of a given duration from the alternating signal, wherein the intervals or interpulse periods contain information on rotational speed, and transmitting additional data in the interpulse periods, wherein the transmission of the additional data is triggered or synchronized by one or more pulses in the sequence of pulses.

2. Method as claimed in claim 1, wherein the additional data is included in a sequence of binary signals or in a bit sequence that are transmitted following each rotational speed sensor pulse or synchronization pulse.

3. Method as claimed in claim 2, wherein the additional data is included in a bit sequence, the total duration of which is shorter than the interpulse periods between successive rotational speed sensor pulses which occur at a maximum rotational speed.

4. Method as claimed in claim 1, wherein the time basis for the sensor pulses and for the binary signals which contain the additional data is produced by way of a common oscillator or clock pulse generator circuit.

5. Method as claimed in claim 1, wherein the additional data is transmitted by currents of predetermined amplitudes, and wherein a basic current value which is sufficient for the operation of the active sensor, a mean current value for the transmission of the additional data and a maximum current value for the representation of the sensor pulses are transmitted on the transmission line.

6. Method as claimed in claim 5, further including the step of:

evaluating for error detection whenever the current on the transmission line falls below a predefined minimum value or exceeds a predefined maximum value.

7. Method as claimed in claim 5, further including the step of:

predetermining tolerance ranges for the basic current value, for the mean current value and for the maximum current value.

8. Method as claimed in claim 1, wherein upon a wheel standstill recognition or in the absence of the rotational speed sensor pulses beyond a predetermined time period, an auxiliary synchronization pulse is generated which triggers the transmission of the additional data.

9. Method as claimed in claim 8, wherein an amplitude of the auxiliary synchronization pulse lies in a tolerance range of a mean current value.

10. Method as claimed in claim 8, wherein when a rotational speed sensor pulse appears during transmission of additional data, the data flow is interrupted and restarted, synchronized by the sensor pulse.

11. Method as claimed in claim 1, wherein the additional data contains pieces of information relating to at least one of the following:

brake lining wear, the air slot between the encoder and the transducer, about the compression travel of a vibration damper, the tire pressure, the driving direction and one or more of these pieces of information.

12. A circuit, comprising:

means for receiving a transmission of a signal including information supplied by an active rotational speed sensor prevailing in the form of load-independent currents of varying amplitudes, and of additional data by way of a joint transmission line, in that a sequence of pulses is produced from the sensor data, the intervals of which pulses contain the information on the rotational speed, and in that in the interpulse periods between the sensor pulses the additional data is transmitted in the form of binary data which is represented by current values of predetermined amplitudes, and the transmission of the additional data is synchronized by the sensor pulses.

13. Circuit arrangement as claimed in claim 12, wherein a basic current value for maintaining the operation of the active sensor, a mean current value for representing and transmitting the additional data and a top current value for representing and transmitting the sensor pulses are predetermined on the transmission line.

14. Circuit arrangement as claimed in claim 12, wherein in the absence of the rotational speed sensor pulse beyond a predetermined duration, an auxiliary synchronization pulse will appear having an amplitude which lies in the range of the mean current value.

* * * * *